(12) United States Patent
Hodgson et al.

(10) Patent No.: US 7,054,521 B2
(45) Date of Patent: May 30, 2006

(54) ARCHITECTURE FOR LARGE OPTICAL FIBER ARRAY USING STANDARD 1×2 COUPLERS

(75) Inventors: Craig W. Hodgson, Thousand Oaks, CA (US); Donald A. Frederick, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 40 days.

(21) Appl. No.: 10/864,656

(22) Filed: Jun. 9, 2004

(65) Prior Publication Data

US 2004/0240780 A1 Dec. 2, 2004

Related U.S. Application Data

(63) Continuation of application No. 09/824,119, filed on Apr. 2, 2001, now Pat. No. 6,768,829, and a continuation of application No. 09/107,399, filed on Jun. 3, 1998, now Pat. No. 6,249,622.

(60) Provisional application No. 60/090,817, filed on Jun. 26, 1998.

(51) Int. Cl.
*G02B 6/28* (2006.01)
*G02B 6/26* (2006.01)
*G01J 1/04* (2006.01)
*G01J 1/42* (2006.01)

(52) U.S. Cl. .............. 385/24; 385/15; 385/31; 385/39; 250/227.12; 250/227.14; 250/227.18; 250/227.27

(58) Field of Classification Search .......... 385/15, 385/17, 31, 24; 398/107; 250/227.14, 227.12
See application file for complete search history.

(56) References Cited

U.S. PATENT DOCUMENTS 6,249,622 B1 * 6/2001 Hodgson et al. .............. 385/24
6,768,829 B1 * 7/2004 Hodgson et al. .............. 385/15

* cited by examiner

*Primary Examiner*—Audrey Chang
(74) *Attorney, Agent, or Firm*—Patti & Brill, LLC

(57) ABSTRACT

Sensor arrays utilizing standard 1×2 couplers reduce the differences in the returned optical power levels by appropriate selection of the coupling ratios. Preferred embodiments are described that comprise 6 distribution fiber lines and 16 return fiber lines. One embodiment includes 16 sensor groups in which each sensor group has a dedicated return line. In another embodiment, 8 sensor groups are configured so that no two adjacent sensors have either a common distribution fiber line or a common return fiber line.

23 Claims, 21 Drawing Sheets

| FIG. 2A | FIG. 2B | FIG. 2C | FIG. 2D | FIG. 2E | FIG. 2F | FIG. 2G | FIG. 2H |

FIG. 2

| FIG. 4A | FIG. 4B | FIG. 4C | FIG. 4D | FIG. 4E | FIG. 4F | FIG. 4G | FIG. 4H |

*FIG. 4*

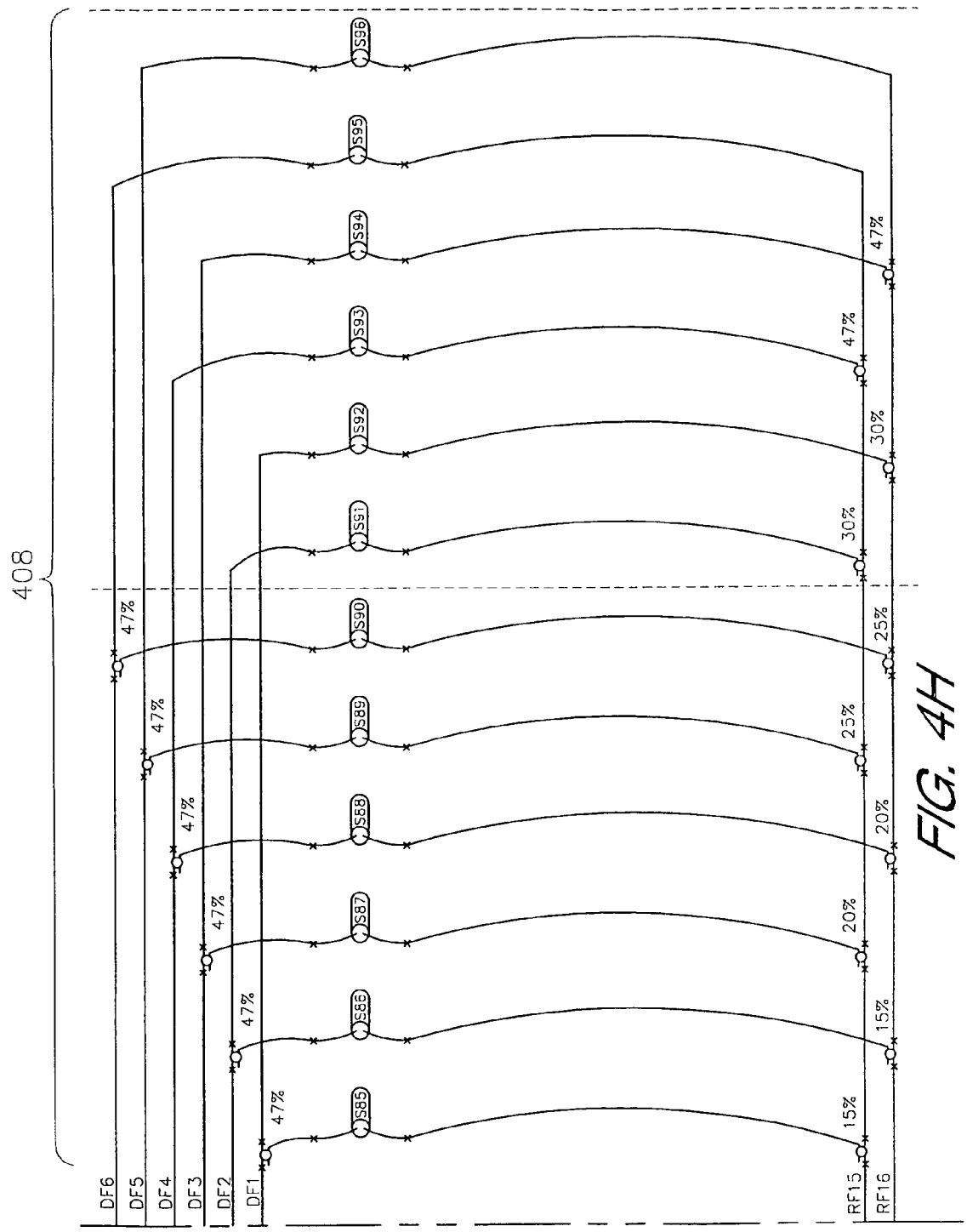

ARCHITECTURE FOR LARGE OPTICAL FIBER ARRAY USING STANDARD 1×2 COUPLERS

RELATED APPLICATIONS

The present application is a continuation and claims priority from U.S. Provisional Application No. 60/090,817 filed on Jun. 26, 1998; U.S. patent application Ser. No. 09/107,399 filed on Jun. 30, 1998, now U.S. Pat. No. 6,249,622 issued on Jun. 19, 2001; and U.S. patent application Ser. No. 09/824,119 filed on Apr. 2, 2001 now U.S. Pat. No. 6,768,829.

BACKGROUND OF THE INVENTION

1. Field of the Invention

The present invention relates generally to sensor arrays for acoustic sensing systems, and more specifically, to sensor arrays in which differences in the returned optical power are reduced.

2. Description of the Related Art

Arrays of fiber optic interferometric sensors show promise in applications where size, electrical interference, and electromagnetic detection make electronic sensors impractical. Such interferometric sensors are capable of measuring a parameter (i.e., a measurand) with a very high dynamic range (e.g., 120 dB). Optical sensor arrays are formed by connecting a series of sensors using fiber optic lines. If each sensor in an array requires a dedicated fiber to carry the detection signal, the large number of fibers required quickly becomes unwieldy as the number of sensors increases.

Optical couplers are commonly used to couple optical signals from a distribution bus to the sensors, and from the sensors to a return bus. In an array in which amplifiers are not used to periodically boost the signal strength, delivering sufficient optical signal to each of the sensors can be problematic. In addition, there may be significant variations in the optical power levels returned to the detectors, thereby complicating the signal processing.

Although significant progress has been made in recent years with respect to the sophistication of sensor array configurations and signal processing techniques, there is still need for improved architectures based on standardized components such as 1×2 couplers, in which the returned optical signals have respective powers within a relatively narrow range.

SUMMARY OF THE INVENTION

One embodiment of the invention is a method of multiplexing optical signals for a sensor array. The method includes the steps of providing a first plurality of sensors having respective inputs and outputs, connecting a first plurality of input couplers to the inputs of the sensors, connecting the input couplers to respective distribution fiber lines which carry respective optical signals having different carrier frequencies, connecting a first plurality of output couplers to the outputs of the sensors, connecting the output couplers to a first return fiber line, and selecting coupling ratios of the output couplers to reduce differences in returned optical signal power levels.

Another embodiment of the invention is a method of multiplexing optical signals for a sensor array. The method includes the steps of providing a plurality of sensors having respective inputs and outputs (in which the inputs and outputs are connected to respective input and output couplers), providing distribution fiber lines which carry respective optical signals having different carrier frequencies, connecting the input couplers to the distribution fiber lines so that each distribution fiber line is only coupled to sensors that are non-adjacent, connecting the output couplers to at least two return fiber lines so that each return line is only coupled to sensors that are non-adjacent, and selecting the coupling ratios of the input and output couplers to reduce differences in the returned optical signal power levels.

A further embodiment of the invention is a sensor array that includes distribution fiber lines, return fiber lines, and sensor groups. Each of the sensor groups in turn comprises sensors, input couplers, and output couplers. The input couplers and the output couplers are connected to respective sensors, in which each of the input couplers within any one of the sensor groups is connected to a different one of the distribution fiber lines. Further, each of the return fiber lines is connected to all output couplers within respective ones of the sensor groups. The coupling ratios of the input couplers and the output couplers in the signal array are chosen to reduce differences in the returned optical signal power levels. In a preferred embodiment, this apparatus is an m×n sensor array comprising m distribution fiber lines, n return fiber lines, and n sensor groups.

A further embodiment of the invention is a sensor array that includes distribution fiber lines and sensor groups. Each of the sensor groups comprises sensors, input couplers, output couplers, and return fiber lines. The input couplers and the output couplers are connected to respective ones of the sensors, wherein no more than two of the input couplers within any one of the sensor groups are connected to any one of the distribution fiber lines. Further, the distribution fiber lines are only coupled to sensors that are non-adjacent. The return fiber lines are connected to each of the output couplers, such that each of the return fiber lines is only coupled to sensors that are non-adjacent. Also, the coupling ratios of the input couplers and the output couplers in this signal array are chosen to reduce differences in the returned optical signal power levels. In a preferred embodiment, this apparatus is a sensor array containing m distribution fiber lines and n sensor groups, in which each of the n sensor groups each contains 2 m sensors.

BRIEF DESCRIPTION OF THE DRAWINGS

FIG. 2, comprising

FIG. 4, comprising FIGS. 4A–4H, illustrates another implementation of the embodiment of FIG. 1, specifically a 6×16 array including 8 sensor groups, in which each sensor group has two return fiber lines, and no two adjacent sensors in the array have either a common distribution fiber line or a common return fiber line.

DETAILED DESCRIPTION OF THE PREFERRED EMBODIMENT

Figure 1:
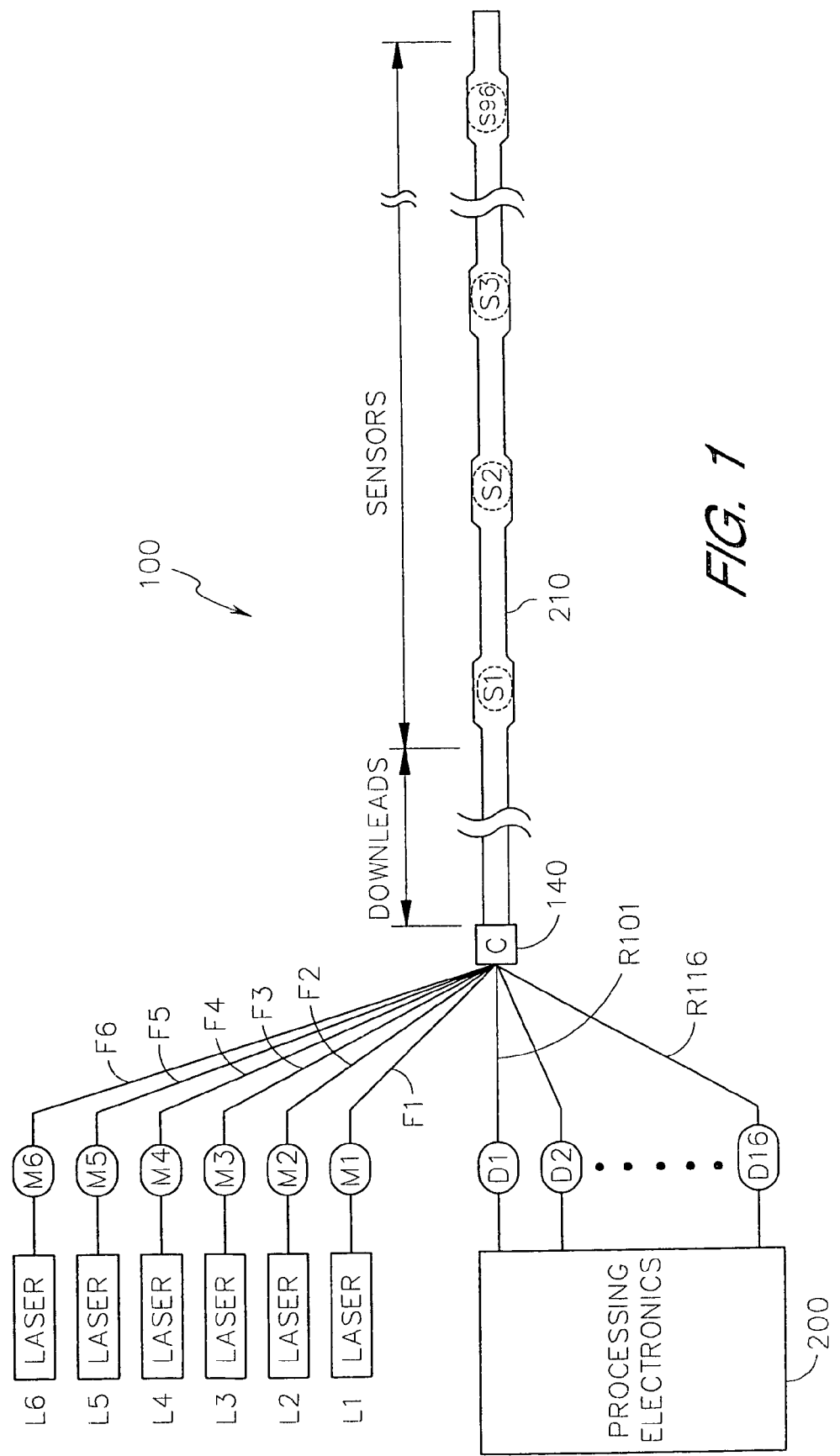
FIG. 1 is a schematic of one embodiment of the invention in which optical signals from a plurality of lasers pass through downleads, into sensors, and are returned to a plurality of detectors for processing.

One embodiment of an acoustic sensing system 100 in accordance with the present invention is shown in FIG. 1. A plurality of lasers L1, L2, L3, L4, L5, L6 generate respective optical signals of different optical frequencies which are modulated by respective modulators M1, M2, M3, M4, M5, M6. In one preferred embodiment of the invention, the lasers L1–L6 generate optical radiation at a nominal wavelength of 1319 nanometers (nm), corresponding to an optical frequency of approximately 230 THz in optical fiber. The frequencies are preferably separated by approximately 1 GHz and are modulated by respective carriers at approximately 3 MHz, with each of the carrier frequencies being unique so that return signals can be multiplexed on the same return fiber before being processed. The lasers L1–L6 may advantageously be Nd:YAG lasers which are all identical except for the optical frequency at which they are operated. The temperatures of the lasers L1–L6 are preferably adjusted so that each laser has a unique operating optical frequency to avoid optical interference between the laser signals.

The optical signals propagate along respective optical feed lines F1–F6 which are connected to an optical connecting block 140. Distribution fiber lines DF1–DF6 (FIG. 2) are connected to the feed lines F1–F6 within the optical connecting block 140. The optical signals from the sensors travel through the distribution fiber lines DF1–DF6 towards a plurality of sensors, which in the exemplary embodiment of FIG. 1 total 96 and are designated S1–S96. The optical signals S1–S96 pass through return optical fibers RF1–RF16 (FIG. 2). The returned optical signals then pass through the connecting block 140 and return fiber lines R101–R116 to respective optical detectors D1–D16. The returned optical signals are detected by the detectors D1–D16 which are coupled to processing electronics 200. The optical distribution fibers DF1–DF6, return fibers RF1–RF16, and the sensors S1–S96 are preferably housed within a cable 210 to protect these components against the environment.

Figure 2A:
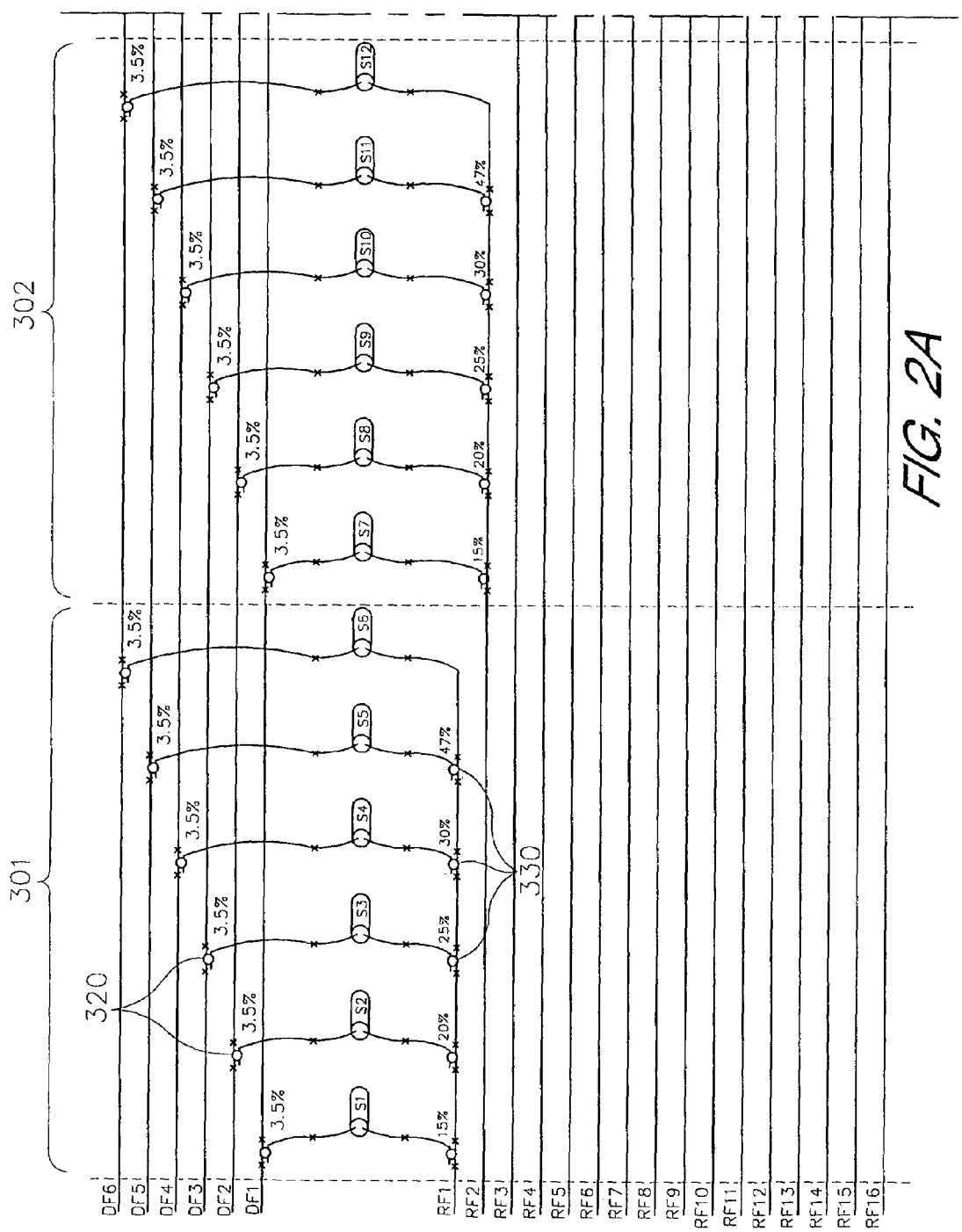
FIGS. 2A–2H, illustrates one implementation of the embodiment of FIG. 1, specifically, a 6×16 array including 16 sensor groups, in which each sensor group has a dedicated return fiber line (bus).
Figure 2B:
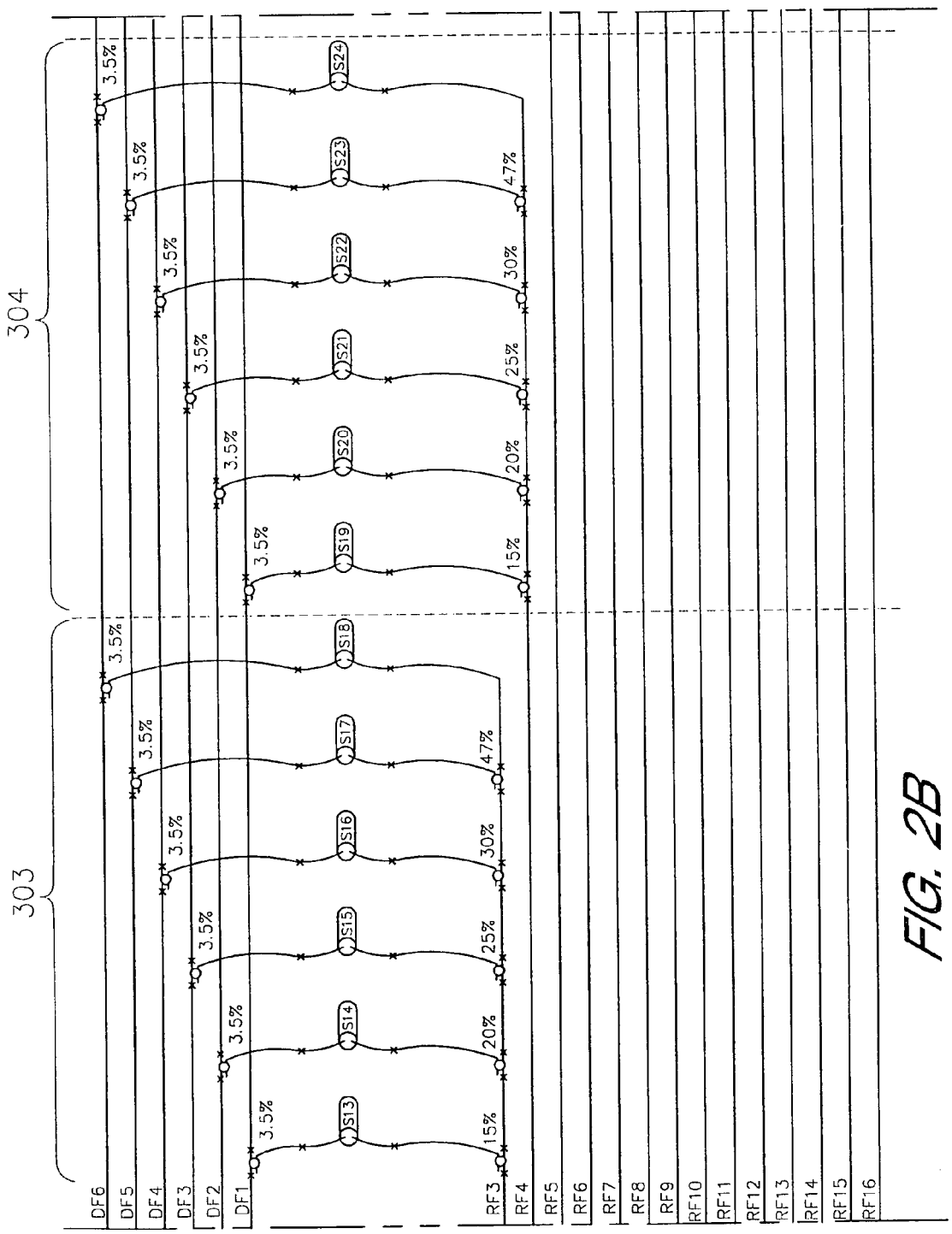
Figure 2C:
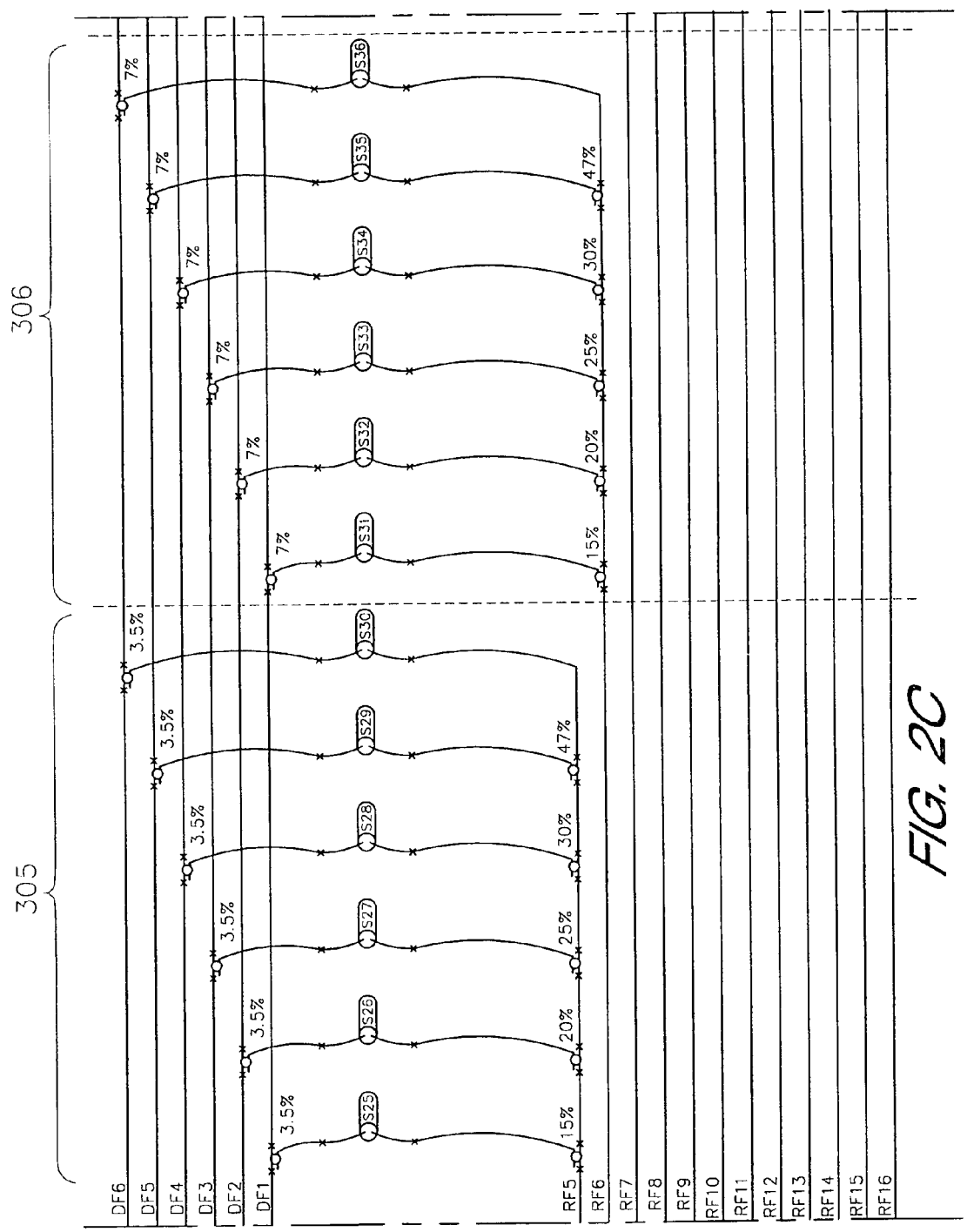
Figure 2D:
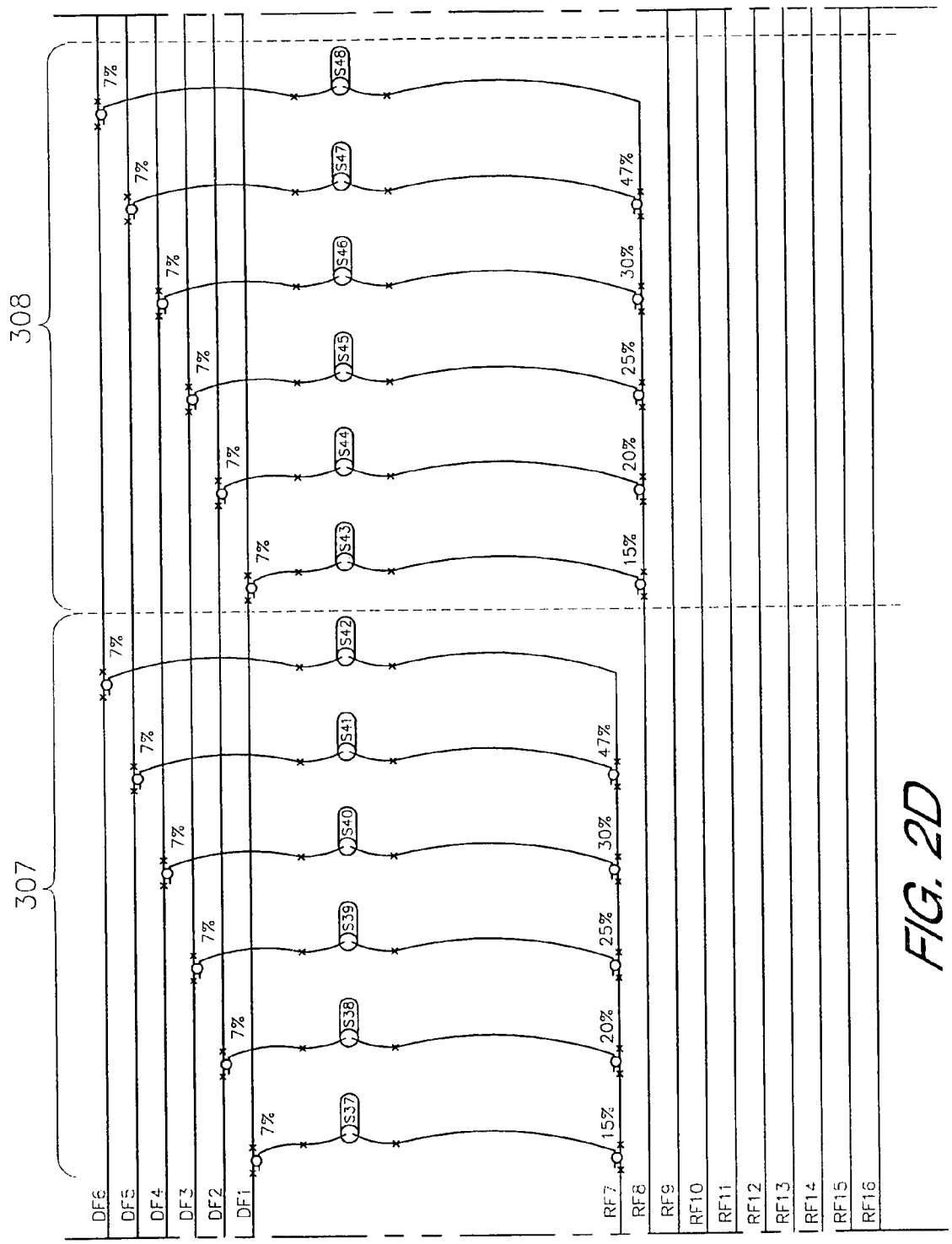
Figure 2E:
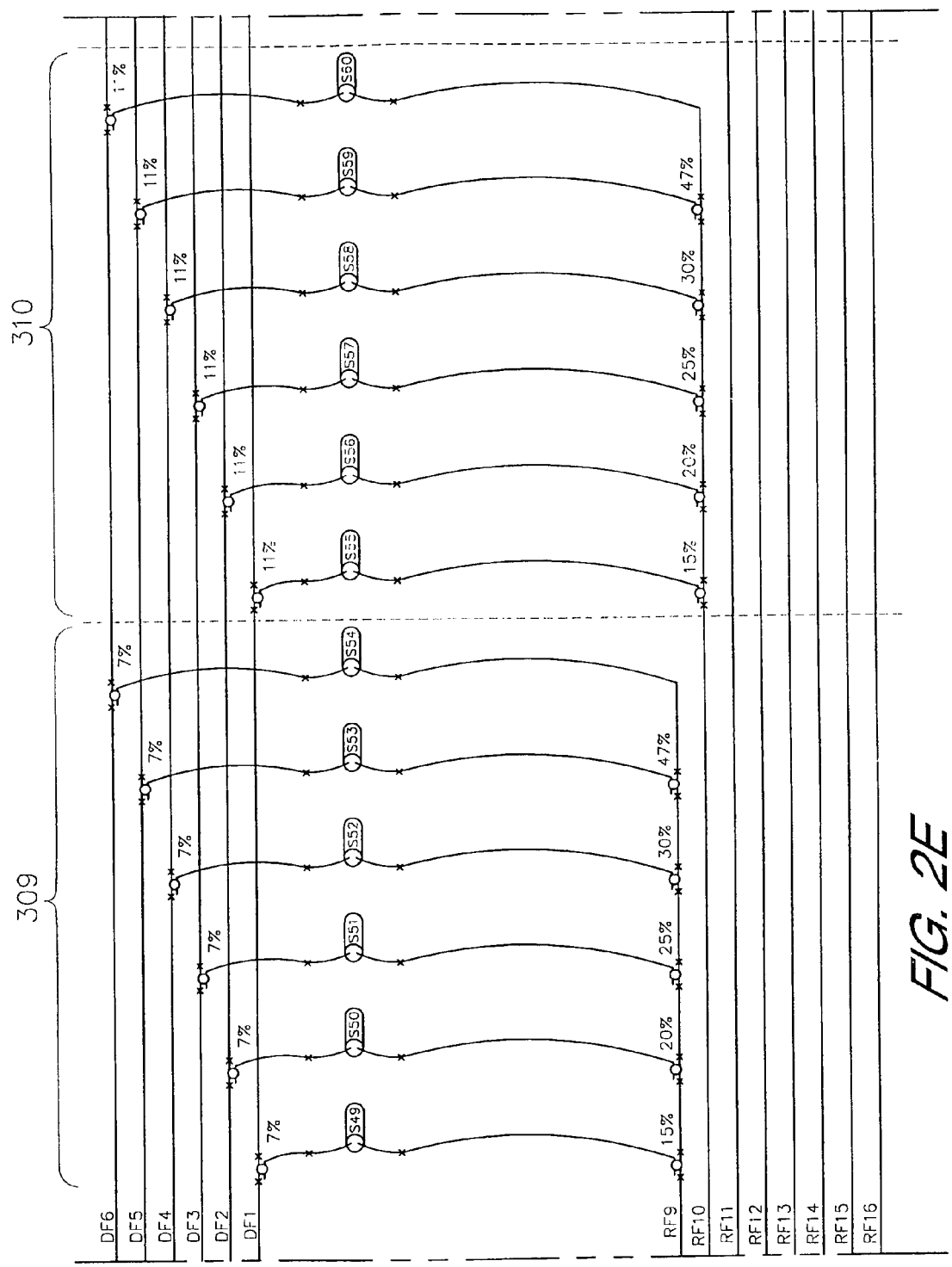
Figure 2F:
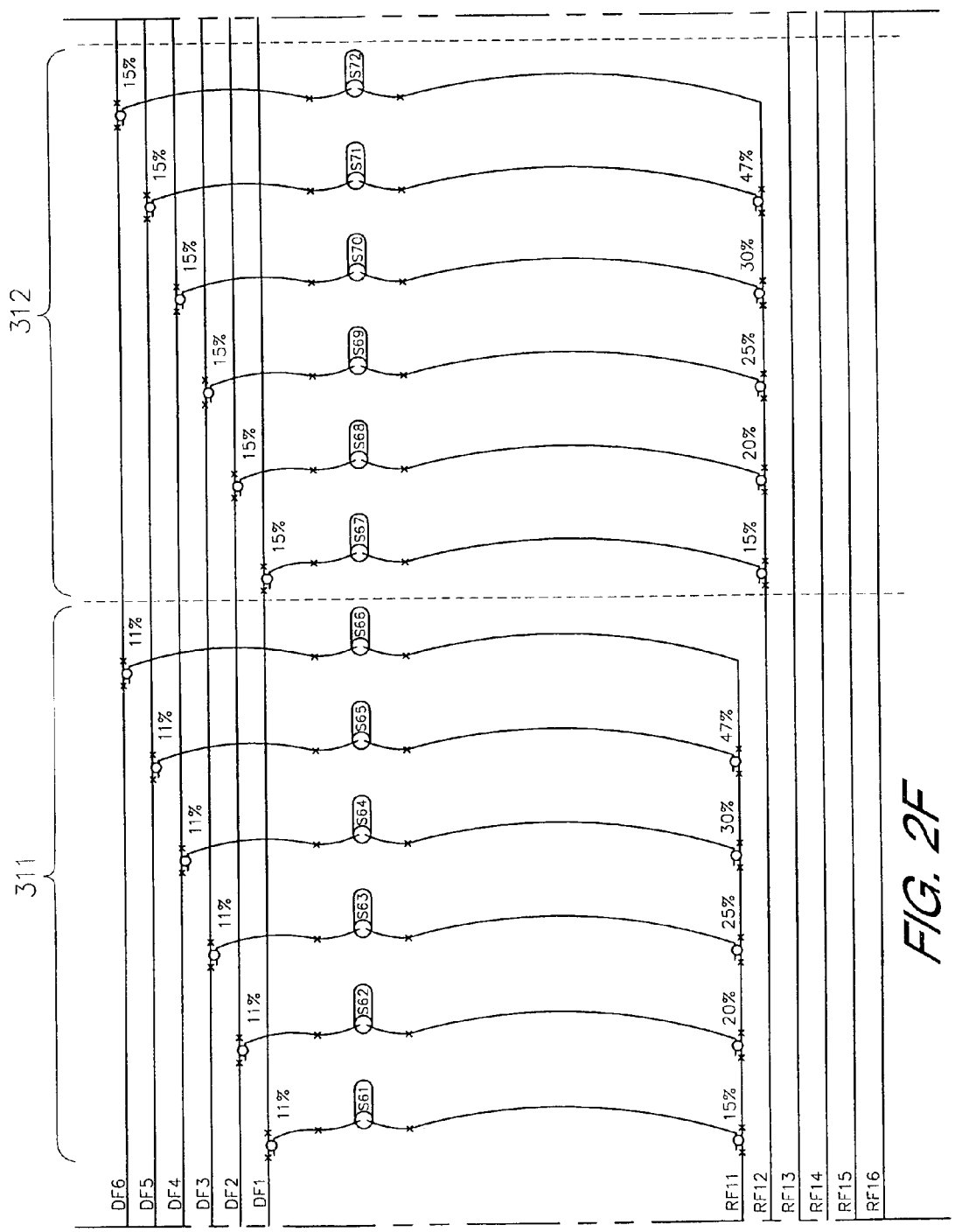
Figure 2G:
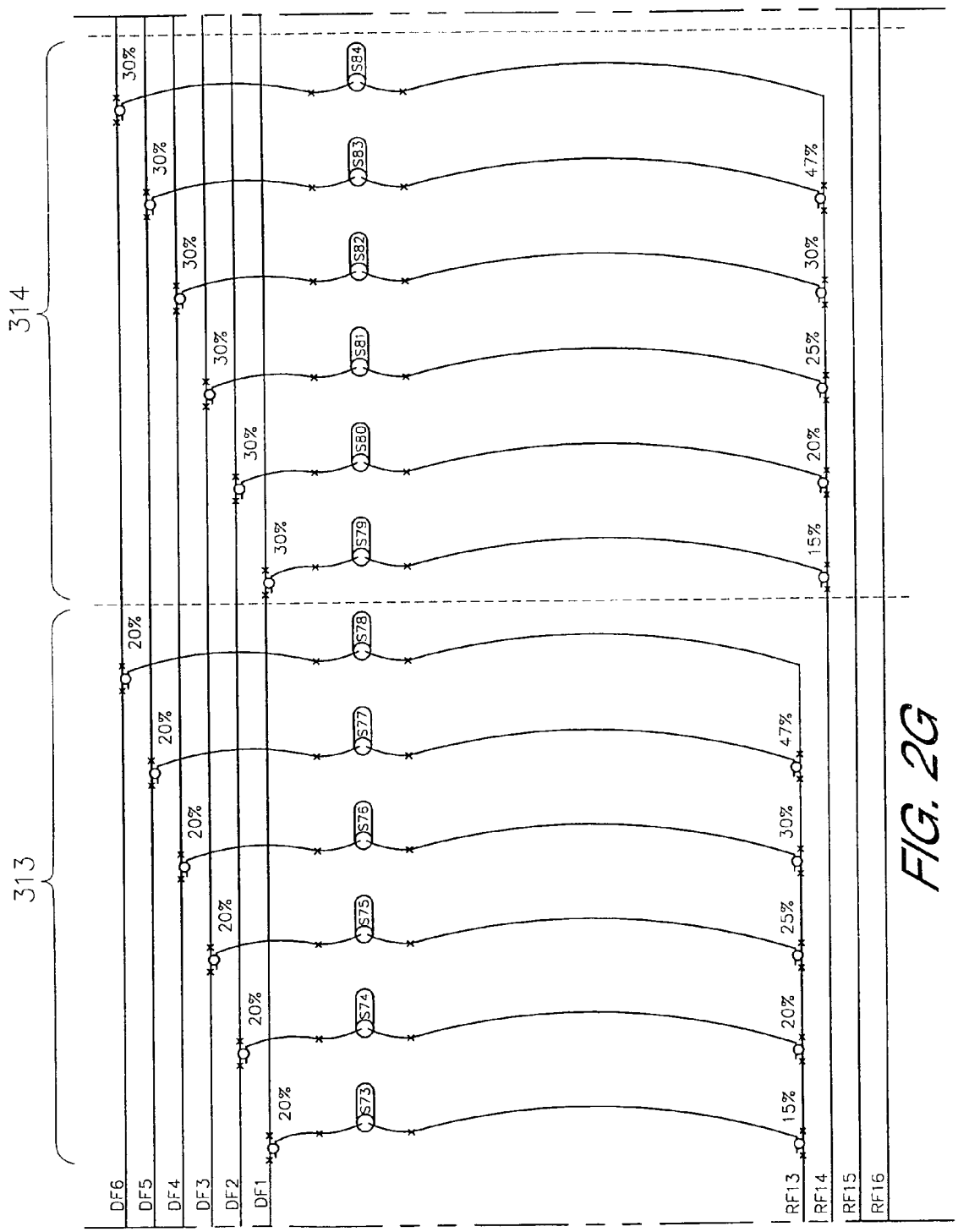
Figure 2H:
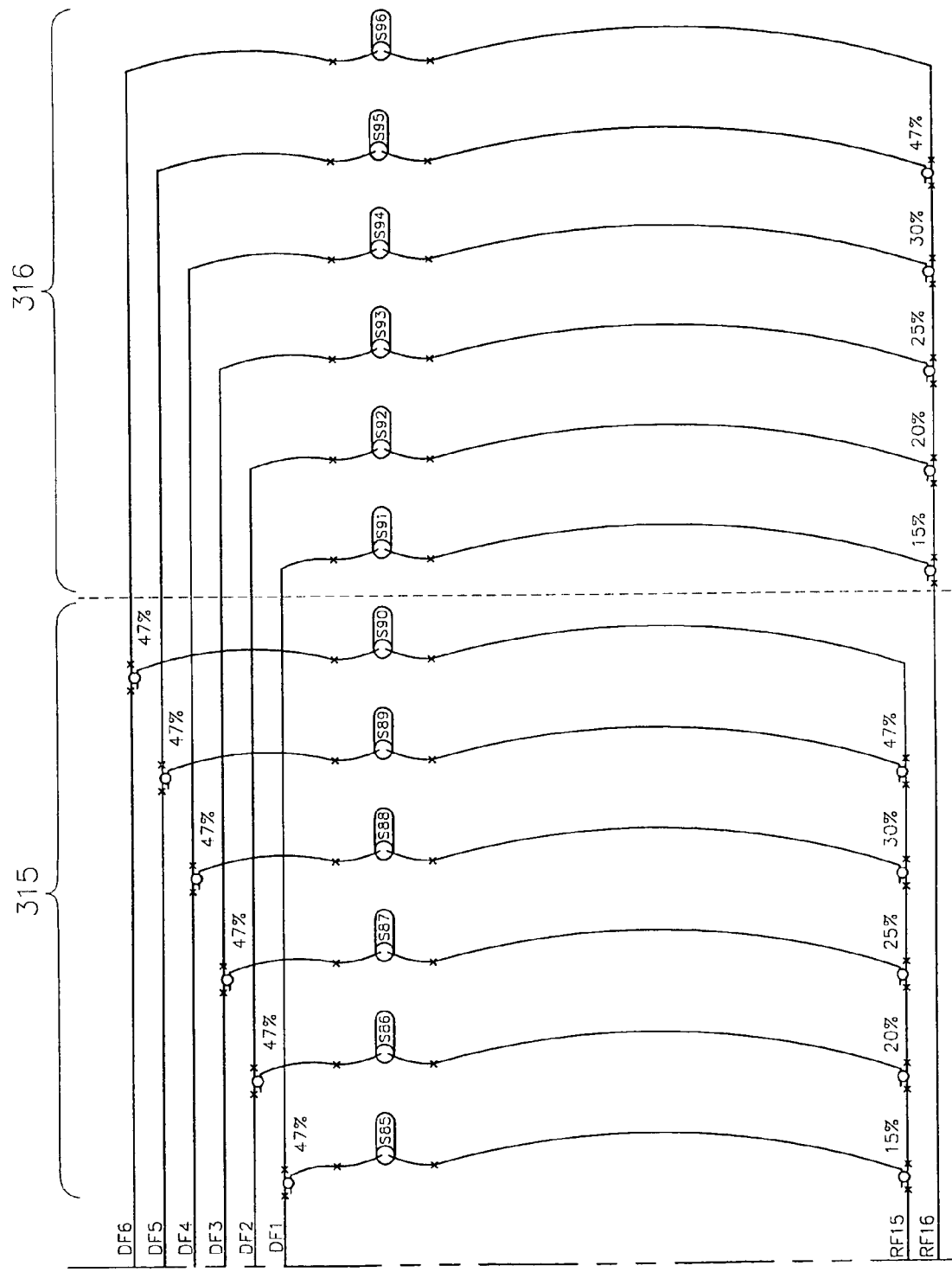

One preferred embodiment of the invention shown in FIG. 1 is illustrated in FIGS. 2 and 2A–2H. In this embodiment, the sensors S1–S96 are divided into 16 sensor groups of 6 sensors each. A first sensor group 301 is shown in FIG. 2A. The sensor group 301 is optically closest to the lasers L1–L6 and to the processing electronics 200. The first sensor group 301 is coupled to the six distribution fiber lines DF1–DF6 through which the input optical signals are carried. The distribution fiber lines DF1–DF6 are connected to respective standard 1×2 input couplers 320 which in turn are connected to sensors S1–S6. The input couplers 320 couple a fraction of the input signal to their respective sensors S1–S6 and pass the remaining optical signal onto other couplers 320, although for some applications the first sensor group 301 alone (without additional sensor groups) may be utilized, in which case the coupling ratio for each of the input couplers 320 is 100%. In the embodiment shown in FIG. 2, however, the coupling ratio for the input couplers 320 of the first sensor group 301 is selected to be 3.5%, with the remaining fraction (96.5% minus any excess losses) of the input signals propagating towards the other sensor groups.

The optical signals passing through the sensors S1–S96 are altered by the sensors (which may be Mach-Zehnder interferometers) to contain information which can then be extracted by the processing electronics 200. For example, in exemplary embodiments, the sensors S1–S96 are responsive to impinging acoustic signals to vary the phase of optical radiation passing through the sensors S1–S96. After passing through the sensors S1–S6, the information-carrying optical signals corresponding to the first five distribution fibers DF1–DF5 (i.e., from the sensors S1–S5) pass through respective standard 1×2 output couplers 330 to a return fiber line RF1, and then to the detector D1 via the return line R101 (FIG. 1). The optical signal corresponding to the sixth distribution fiber DF6, which passes through the sensor S6, may enter the return fiber line RF1 directly without an output coupler. However, the optical signal from the sixth sensor S6 does pass through the five optical couplers 330 corresponding to the sensors S1–S5 as it propagates through the return fiber RF1. Similarly, the optical signal from the fifth sensor S5 passes through the four couplers 330 associated with the sensors S1–S4, and so on. The output couplers 330 of the other sensor groups have a similar configuration with respect to the return fiber lines RF1–RF16.

The output couplers 330 have respective coupling ratios chosen to reduce differences in the respective returned optical signal power levels. The coupling ratios are preferably chosen such that the signal levels of the optical signals returned from the sensor groups to their associated detectors D1–D16 are within a 7 dB range of each other. Thus, the respective coupling ratios for the output couplers 330 within each sensor group are selected to be approximately ½, ⅓, ¼, ⅕, and ⅙. In one preferred working embodiment, the output coupling ratios were chosen to be about 47, 30, 25, 20 and 15%, respectively, as illustrated in FIG. 2A. These coupling ratios deviate from the ideal ratios expressed above to compensate for excess losses in the return lines. In particular, the coupling ratios of the return couplers 330 are selected to be progressively larger from the sensor S1 to the sensor S6 (S6 has an effective coupling ratio of 100%) to compensate for the fact that the signals from the sensors S1–S6 pass through different combinations of couplers, causing each return signal to have a different overall transmission through the return fiber RF1.

In the embodiment of FIG. 2, additional sensor groups are coupled to the same distribution fiber lines DF1–DF6 to which the first sensor group 301 is coupled. The return fiber line RF1, RF2, . . . , RF16 for each sensor group is unique, however. That is, the sensors from different sensor groups do not share a return fiber line. Thus, each of the return fiber lines RF1–RF16 is dedicated to a particular sensor group, with the optical signals from each sensor group being multiplexed onto one return fiber line.

In each sensor group, a certain fraction of the input optical signal in each distribution fiber line DF1–DF6 is directed (coupled) into the sensors of that group. However, to maintain roughly the same level of input optical power at each sensor, this fraction is higher for sensor groups further removed from the lasers L1–L6, since optical power must be shared among fewer subsequent sensor groups. Thus, the input coupling ratio is chosen to be 7% at sensors S31–S54, 11% at sensors S55–S66, 15% at sensors S67–S72, 20% at sensors S73–S78, 30% at sensors S79–S84, 47% at sensors S85–S90, and 100% at sensors S91–S96 at which point an input coupler is no longer needed.

The coupling ratios of the input couplers 320 and the output couplers 330 are selected to reduce differences in the level of optical signal delivered to each sensor S1–S96, and more particularly, to reduce differences in the returned optical signal power levels at the detectors D1–D16. Preferably, the 96 optical signals arriving at the detectors D1–D16 have respective powers within a 7 dB range, as illustrated graphically in FIG. 3.

Figure 3:
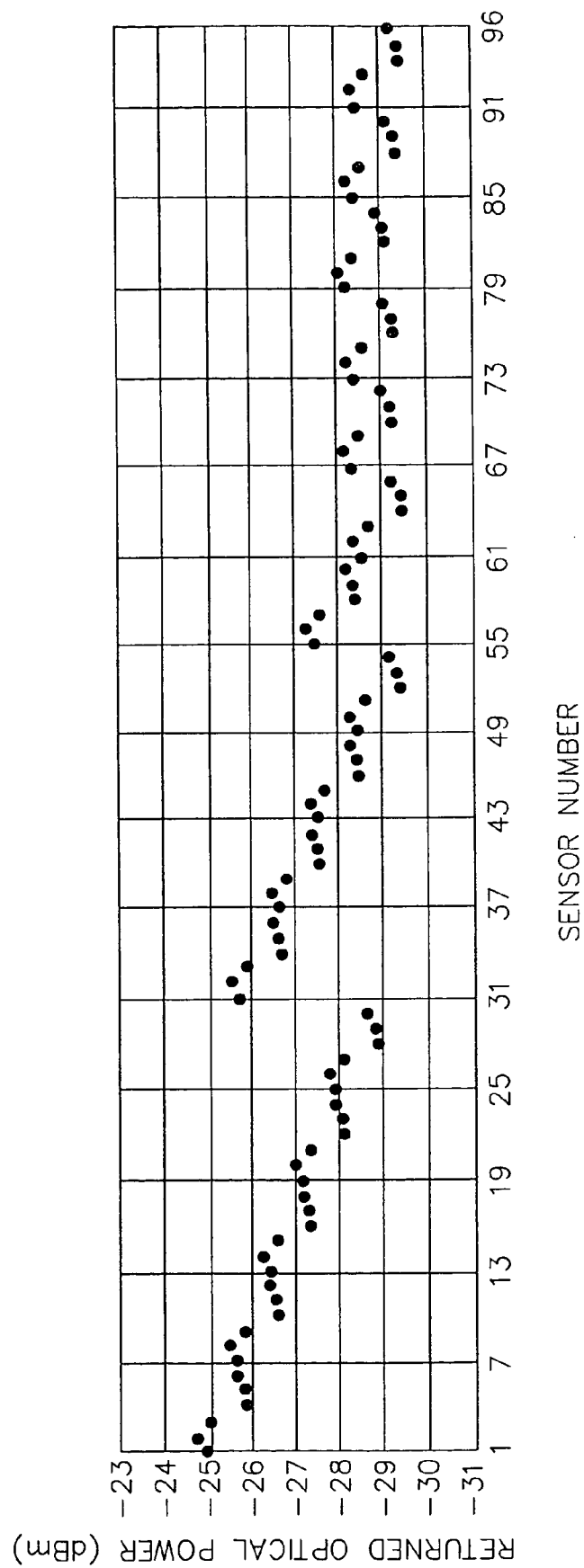
FIG. 3 illustrates the returned optical power versus sensor number for the embodiment shown in FIG. 2.
Figure 4A:
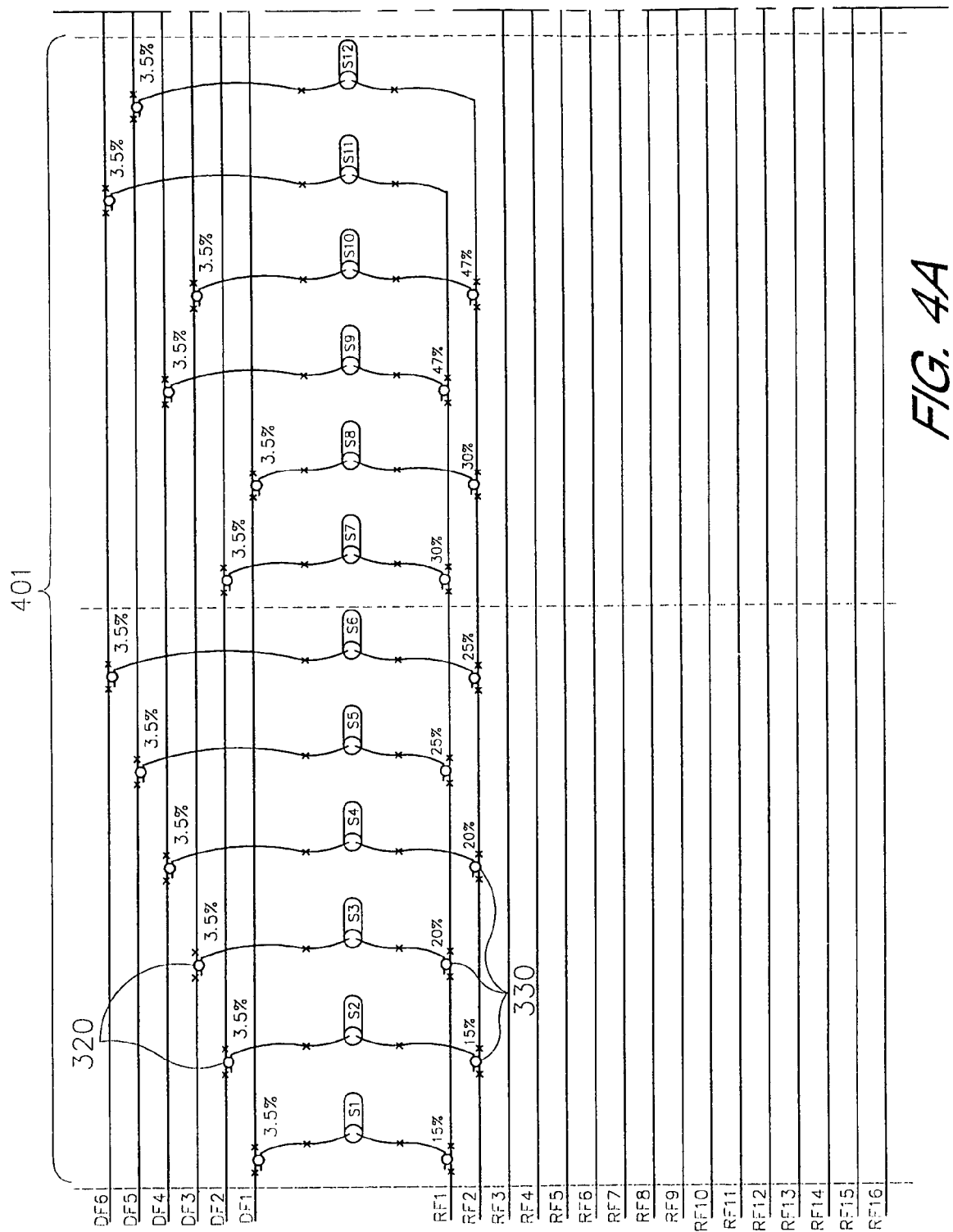
Figure 4B:
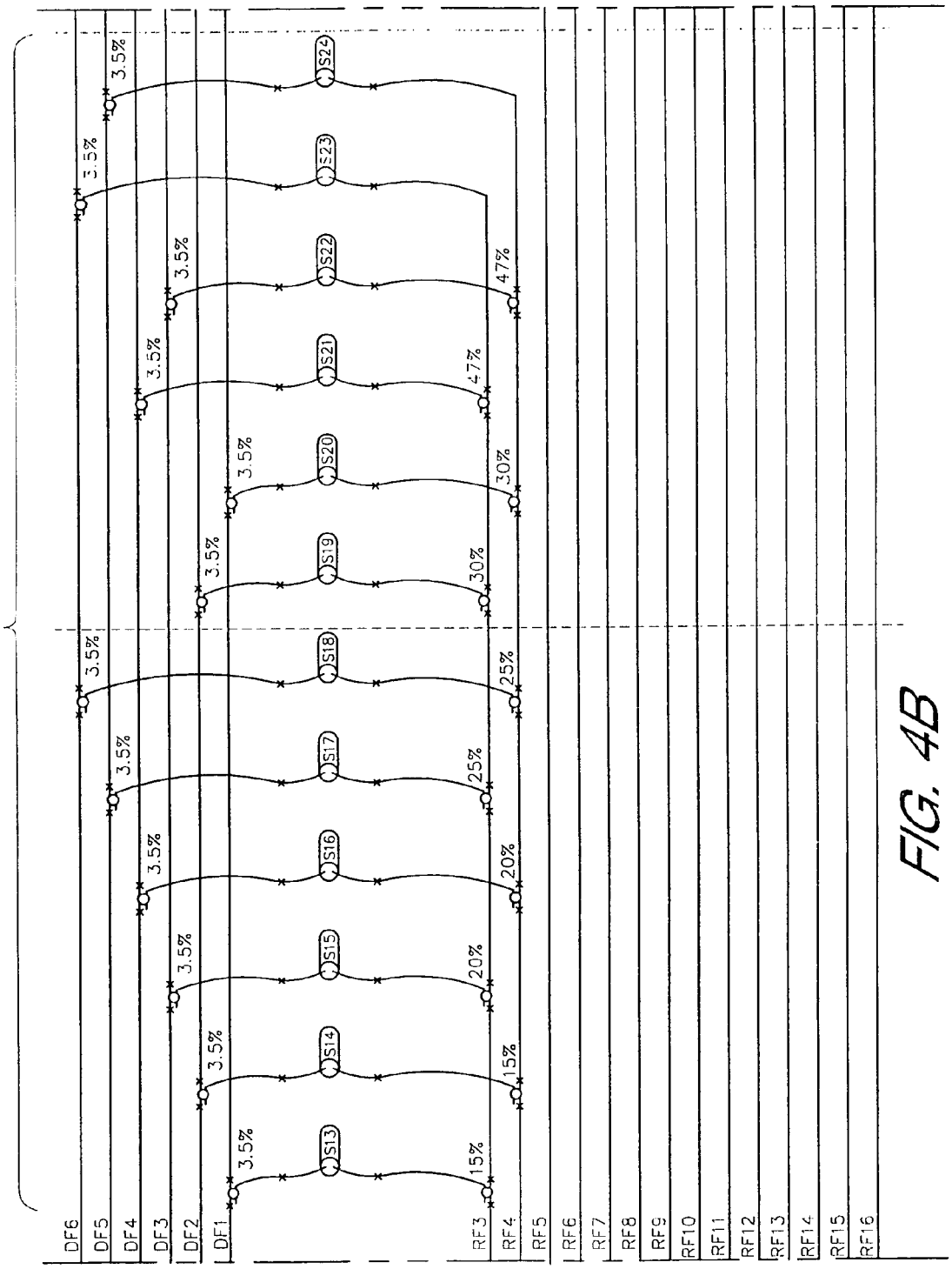
Figure 4C:
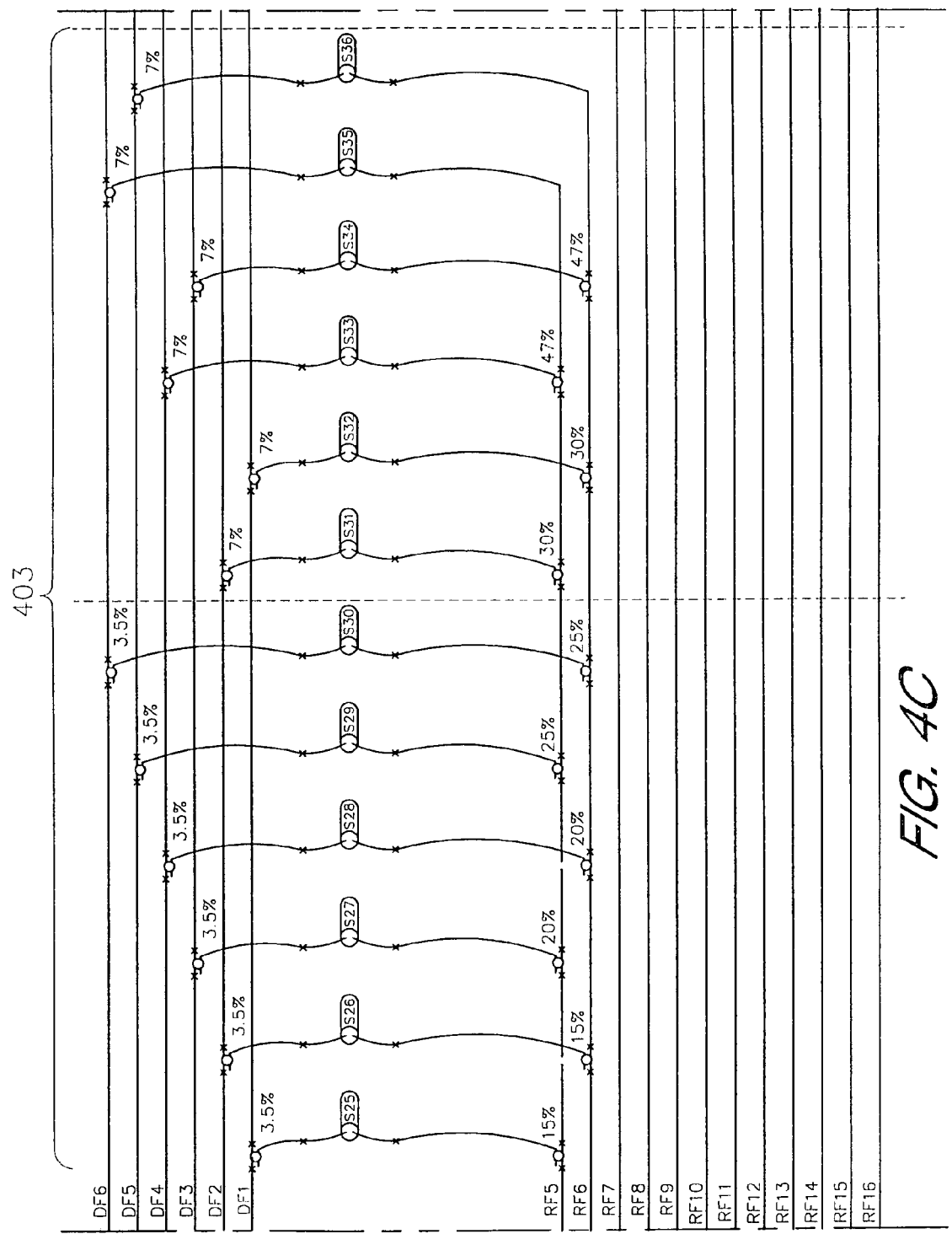
Figure 4D:
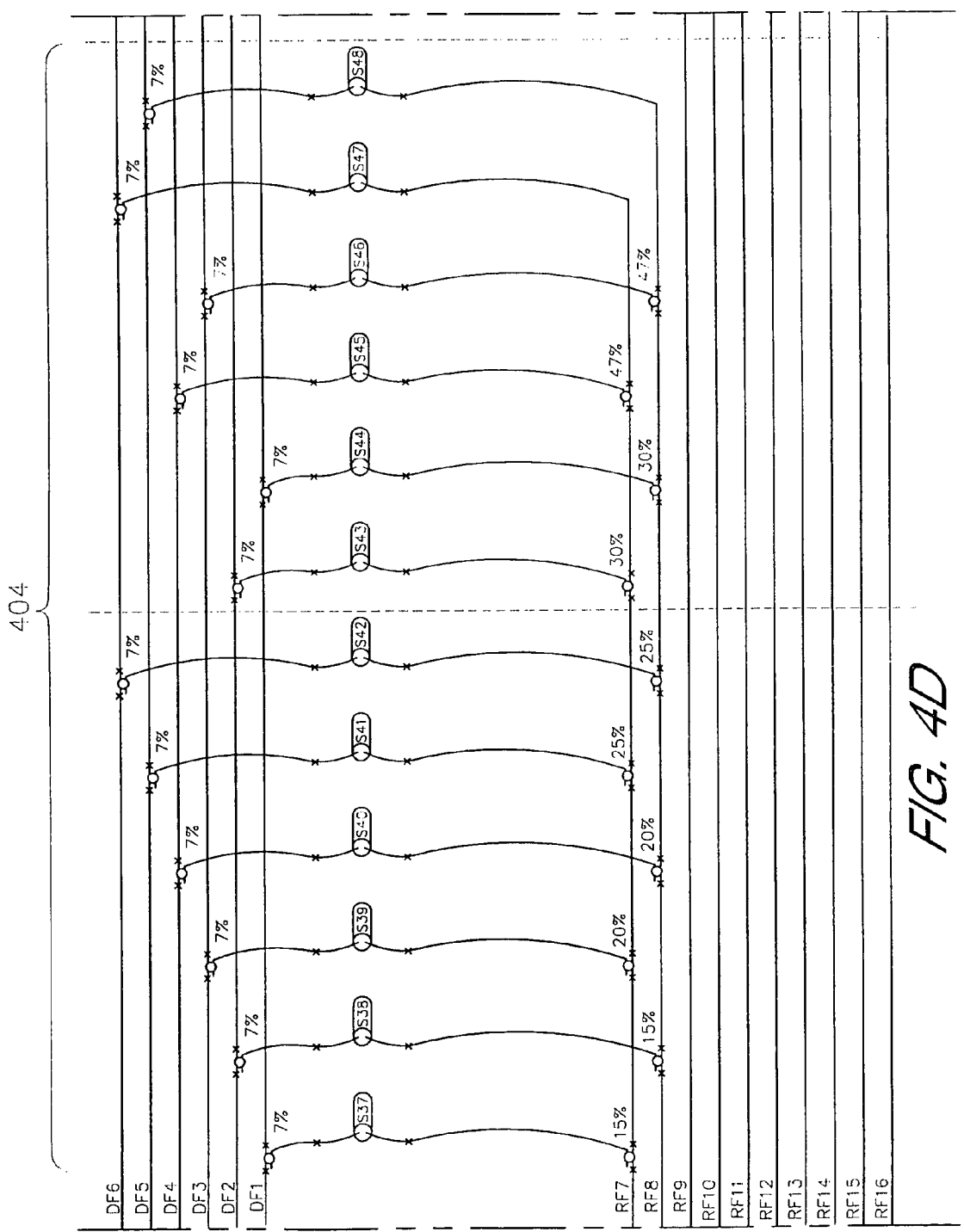
Figure 4E:
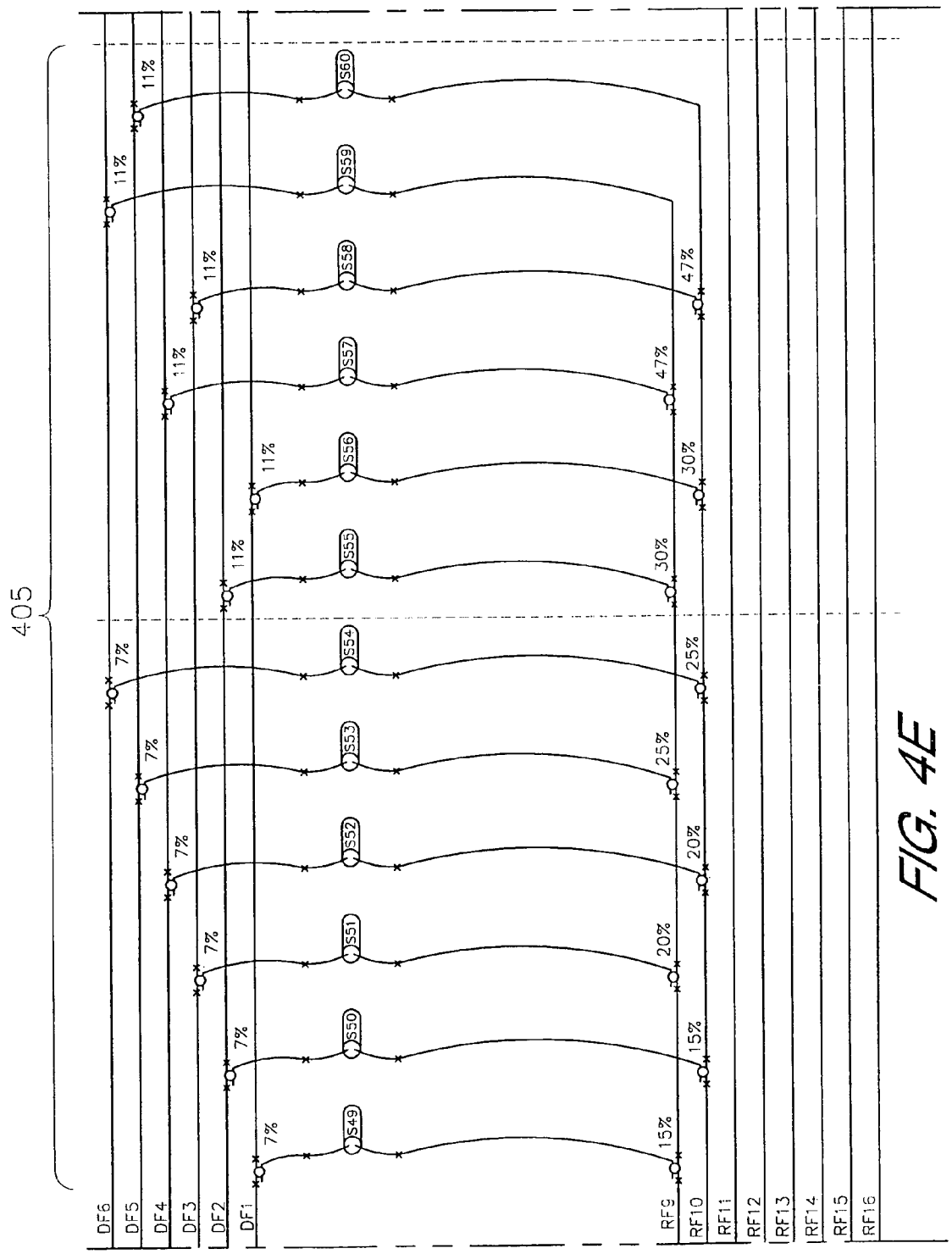
Figure 4F:
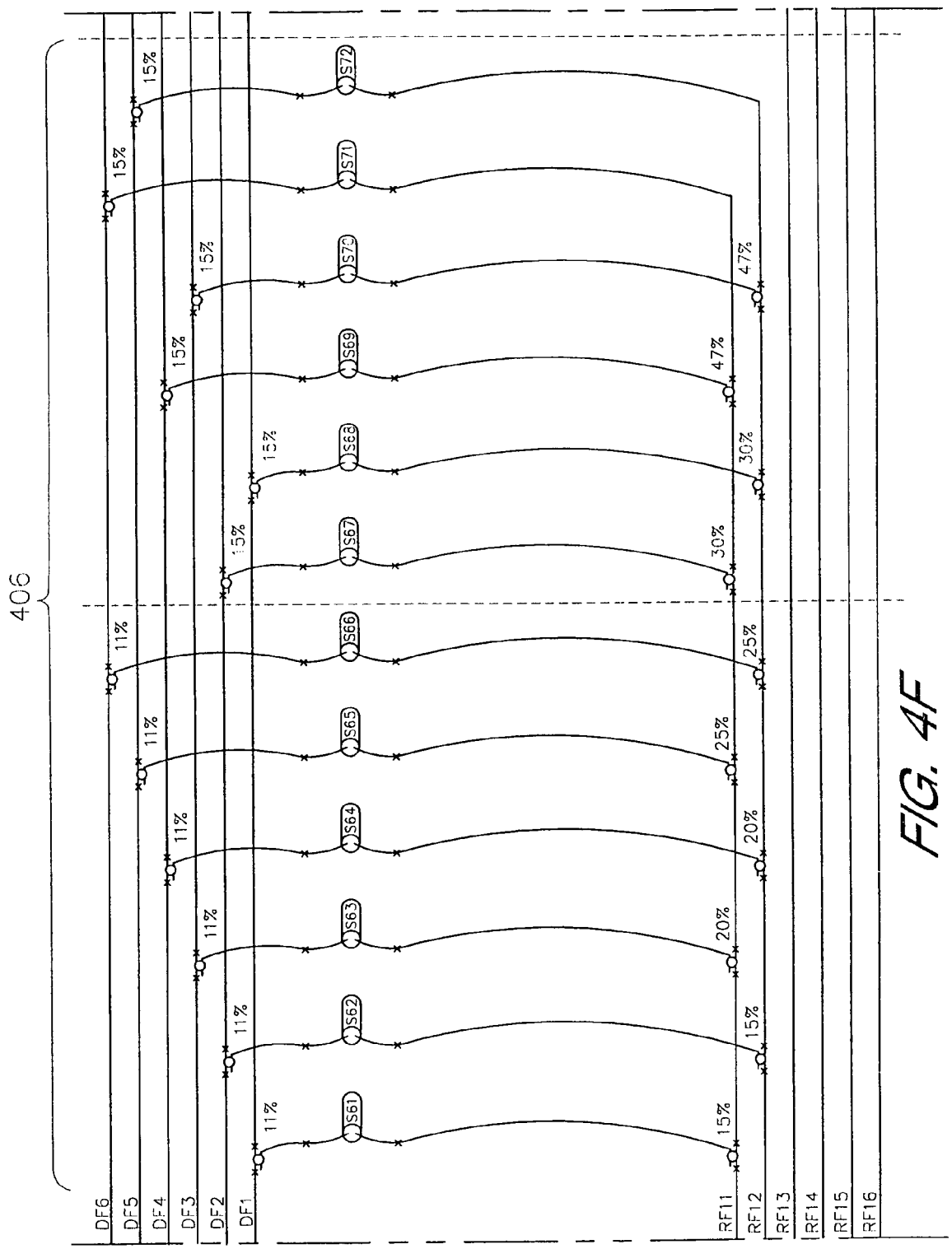
Figure 4G:
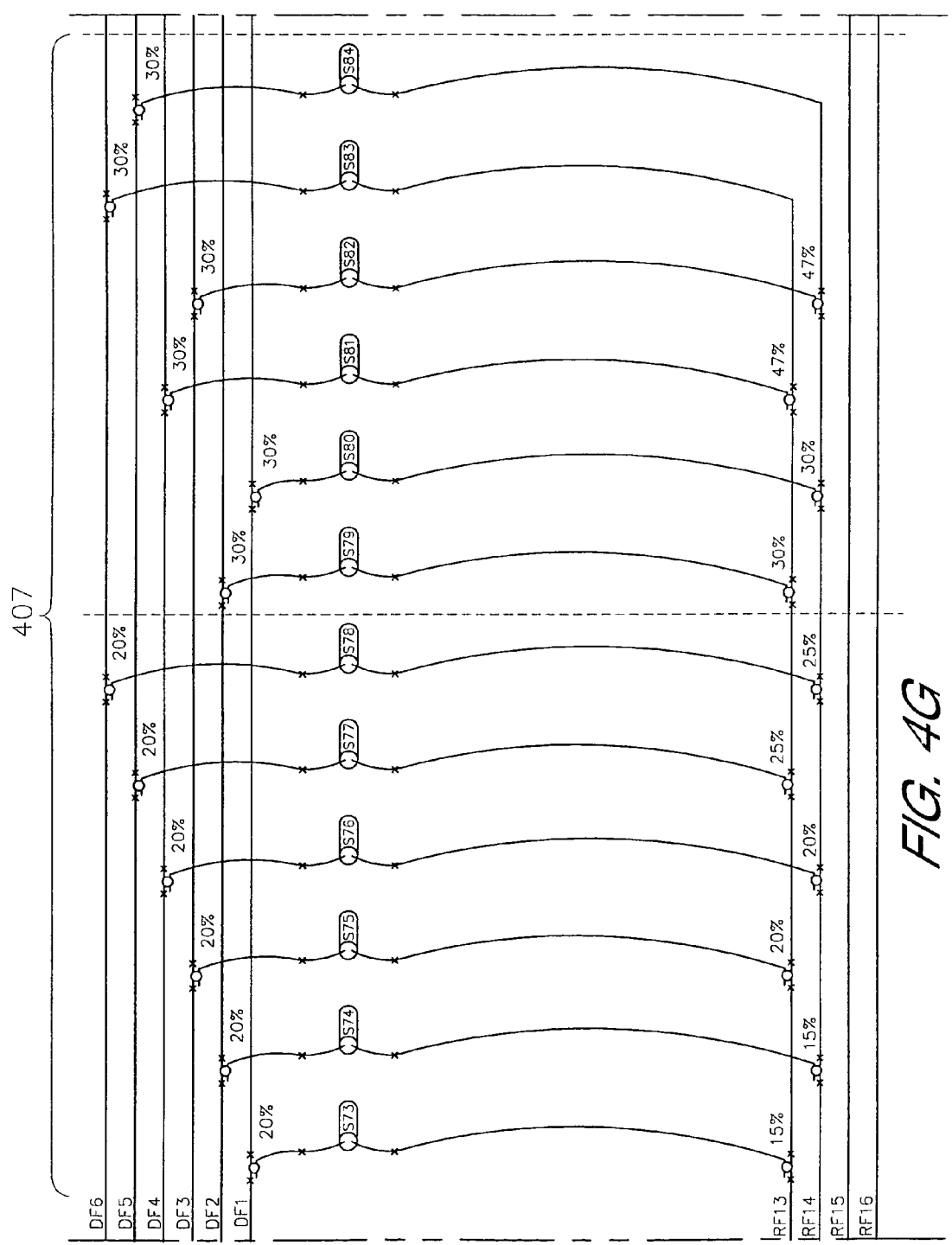

Note that in FIG. 3, the return power within each group varies with respect to the positions of the sensors in each group because of the five different return coupling ratios of the couplers 330 in each group. The return power is progressively reduced for the groups 302, 303, 304, and 305, because the same input coupling ratio is retained, but each group receives progressively less input power from the respective distribution lines. The group 306 has a large return power because of the increase of the input coupling ratio to 7%. The subsequent groups 307, 308, and 309 having 7% input coupling ratios have progressively less return power. The changes in return power for the groups 310–316 can likewise be explained by their respective input coupling ratios in view of the lower power remaining on the distribution lines at the inputs to each group. Small changes to the coupling ratios which would exactly equalize the returned signal powers are foregone in order to reduce the number of unique coupling ratios employed. This approach reduces the manufacturing costs of the array while still providing substantially equal returned optical signals, i.e., within a 7 dB range.

FIG. 3 illustrates the returned optical power at the detectors D1–D16 corresponding to each sensor number for the embodiment of FIG. 2. The returned optical power (dBm) for an optical power of 15.44 dBm (35 mW) from each laser L1–L6 was calculated by making certain assumptions about the optical losses for this configuration. Specifically, the optical losses were assumed to be 0.15 dB for each splice (designated as an "x" in FIG. 2), 3.5 dB at each modulator M1–M6, 0.5 dB for each input connector 320 and each output connector 330, 0.5 dB for the connecting block 140, 6.8 dB at each sensor S1–S96, 5 dB at each detector D1–D16, and 0.5 dB per kilometer (km) of fiber. Also, the length of the downlead portion shown in FIG. 1 was taken to be 1.2 km, and the spacing between adjacent sensors was taken to be 0.05 km (50 meters). Further, the respective total losses for the various optical paths between the lasers L1–L6 and the detectors D1–D16 (96 paths in all, in which each path is associated with one of the sensors S1–S96) was calculated by taking into account losses common to all of the optical paths. Specifically, there was assumed to be one splice (not shown) between each of the lasers L1–L6 and their respective modulators M1–M6, one splice (not shown) between each of the modulators and the connecting block 140, one splice on either side of each of the optical connectors 320 (330), one splice on each side of each sensor S1–S96, and one splice (not shown) between the optical connecting block and each of the detectors D1–D16. As illustrated in FIG. 3, the returned optical powers collectively fall within about a 5 dB range, although a wider range up to 6 or 7 dB may also be provided.

Another preferred embodiment of the invention shown in FIG. 1 is illustrated in FIG. 4. The embodiment of FIG. 4 includes 8 sensor groups of 12 sensors each. The sensors within each group are coupled (using output couplers 330) to two return fiber lines so that adjacent sensors are not coupled to the same return fiber line. For example, a first sensor group 401, return fibers RF1 and RF2 are coupled to the odd and even numbered sensors in that group, respectively. Thus, if either the return fiber RF1 or RF2 breaks, information from every other sensor is lost, but it is still possible to extract useful information from the sensor group 400. This would not be possible in a group in which every sensor were tied to the same return fiber line.

Another feature of the embodiment of FIG. 4 is that each of the 6 distribution fiber lines D1–D6 is coupled to two sensors within each sensor group (using input couplers 320), but the coupling geometry is staggered such that a given optical signal from one of the lasers L1–L6 does not serve as input to two sensors coupled to the same return fiber line. Otherwise, optical signals on the respective return lines RF1–RF6 could not be multiplexed.

The other sensor groups 402–408 are likewise tied to the six distribution fiber lines D1–D6, such that no two adjacent sensors in the array are served by the same distribution fiber line. Each sensor group, however, has two return fiber lines dedicated to its sensors, with no two adjacent sensors being tied to the same return fiber line. Thus, the sensor array of FIG. 4 is constructed such that the breakage of one of the fiber lines (either one of the distribution fiber lines DF1–DF6 or one of the return fiber lines RF1–RF16) will not affect any two adjacent sensors. In this way, useful information can still be extracted from each of the sensor groups. Further, the returned optical signals of this embodiment also preferably have respective powers within a 6–7 dB range, and more preferably 5 dB, after passing through the return fiber lines RF1–RF16 and being detected by the detectors D1–D16.

Figure 5:
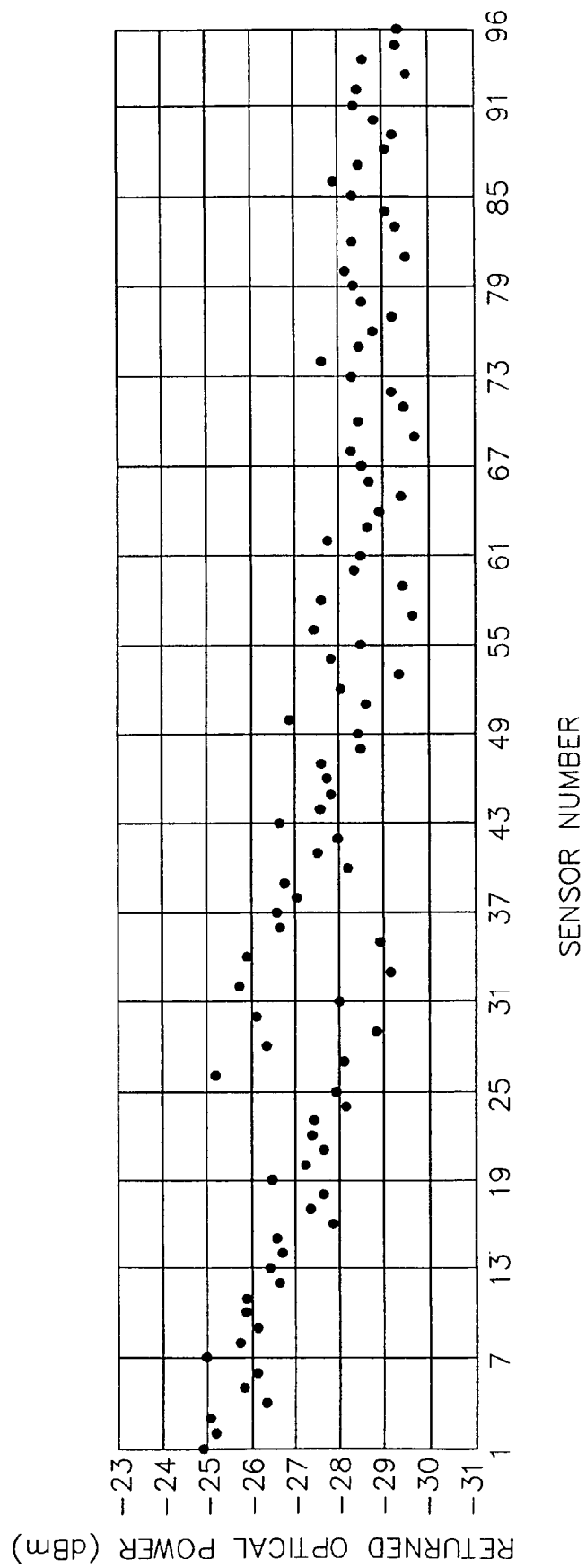
FIG. 5 illustrates the returned optical power versus sensor number for the embodiment shown in FIG. 4.

FIG. 5 illustrates the returned optical power at the detectors D1–D16 corresponding to each sensor number for the embodiment of FIG. 4 and is analogous to FIG. 3. Similar assumptions regarding optical losses made for FIG. 3 were also made for FIG. 5, and, once again, an optical power of 15.44 dBm (35 mW) was assumed for each laser L1–L6. As illustrated in FIG. 5, the returned optical powers collectively fall within about a 5 dB range, although a wider range up to 6 or 7 dB may also be provided.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. A sensor array, comprising:
   distribution fiber lines;
   return fiber lines; and
   sensor groups, each of said sensor groups comprising:
      sensors; and
      input couplers and output couplers, said input couplers and said output couplers being connected to respective ones of said sensors, wherein each of said input couplers within any of said sensor groups is connected to a corresponding one of said distribution fiber lines, wherein each of said output couplers within any of said sensor groups is connected to a corresponding one of said return fiber lines;
   wherein coupling ratios of said input couplers and said output couplers in said sensor groups are chosen to reduce differences in returned optical signal power levels;
   wherein said output couplers comprise a first output coupler and a second output coupler, wherein a first number of said output couplers are located between said first output coupler and a signal destination on one of said return fiber lines, wherein the first number is greater than or equal to zero, wherein the coupling ratio of said first output coupler is based on the first number, wherein a second number of said output couplers are located between said second output coupler and the signal destination on the one of said return fiber lines, wherein the coupling ratio of said second output coupler is based on the second number, wherein the second number is greater than the first number, wherein the coupling ratio of said second output coupler is larger than the coupling ratio of said first output coupler.

2. The sensor array of claim 1, wherein each of said distribution fiber lines is coupled only to sensors that are non-adjacent.

3. The sensor array of claim 1, wherein the coupling ratio of any one of said output couplers is based on a number of said output couplers located between the any one of said output couplers and a signal destination on one of the said return fiber lines that corresponds to the any one of said output couplers.

4. The sensor array of claim 3, wherein the coupling ratio of the any one of said output couplers varies directly with the number of said output couplers located between the any one of said output couplers and the signal destination that corresponds to the any one of said output couplers.

5. The sensor array of claim 1, wherein the coupling ratio of any one of said input couplers is based on a number of said input couplers located between the any one of said input couplers and a signal source on one of the said distribution fiber lines that corresponds to the any one of said input couplers.

6. The sensor array of claim 1, wherein the coupling ratios of said input couplers in said sensor groups include coupling ratios of 3.5%, 7%, 11%, 15%, 20%, 30% and 47%.

7. The sensor array of claim 1, wherein the coupling ratios of said output couplers connected to one of said return fiber lines include coupling ratios of 15%, 20%, 25%, 30% and 47%.

8. The sensor array of claim 1, wherein the coupling ratios of said input couplers and said output couplers in said sensor groups serve to cause all the returned optical signal power levels to be within a preselected variance range.

9. The sensor array of claim 1, wherein said sensor are in number greater than or equal to said distribution fiber lines.

10. The sensor array of claim 1, wherein a multiplicative product of said distribution fiber lines and said return lines is equal to a multiplicative product of said sensor groups and said sensors.

11. The sensor array of claim 1, wherein one or more distribution fiber lines of the distribution fiber lines are each coupled with two or more corresponding non-adjacent instances of the sensors.

12. The sensor array of claim 1, wherein said sensor groups comprise 16 sensor groups, wherein said sensors comprise 6 sensors.

13. The sensor array of claim 1, wherein said sensor groups comprise 8 sensor groups, wherein said sensors comprise 12 sensors.

14. The sensor array of claim 1, wherein each of said input couplers within any one of said sensor groups is connected to a respective one of said distribution fiber lines.

15. The sensor array of claim 1, wherein each of said return fiber lines is connected to all output couplers within a respective one of said sensor groups.

16. A sensor array, comprising:
distribution fiber lines;
return fiber lines; and
sensor groups, each of said sensor groups comprising:
    sensors; and
    input couplers and output couplers, said input couplers and said output couplers being connected to respective ones of said sensors, wherein each of said input couplers within any of said sensor groups is connected to a corresponding one of said distribution fiber lines, wherein each of said output couplers within any of said sensor groups is connected to a corresponding one of said return fiber lines;
wherein coupling ratios of said input couplers and said output couplers in said sensor groups are chosen to reduce differences in returned optical signal power levels, wherein said input couplers comprise a first input coupler and a second input coupler, wherein a first number of said input coupler, are located between a signal source and said first input coupler on one of said distribution fiber lines, wherein the first number is greater than or equal to zero, wherein a second number of said input couplers are located between the signal source and said second input coupler on the one of said distribution lines, wherein the second number is greater than the first number, wherein the input coupling ratio of said second input coupler is higher than the input coupling ratio of said first input coupler.

17. The sensor array of claim 16, wherein said sensor groups comprise 16 sensor groups, wherein said sensors comprise 6 sensors.

18. The sensor array of claim 16, wherein said sensor groups comprise 8 sensor groups, wherein said sensors comprise 12 sensors.

19. A sensor array, comprising:
distribution fiber lines;
return fiber lines; and
sensor groups, each of said sensor groups comprising:
    sensors; and
    input couplers and output couplers, said input couplers and said output couplers being connected to respective ones of said sensors, each of said input couplers within any one of said sensor groups being connected to a different one of said distribution fiber lines;
wherein the return fiber lines comprise one or more sets of return fiber lines, wherein a first one of each of the one or more sets of return fiber lines is connected to a first subset of said output couplers within a respective one of said sensor groups, wherein a second one of each of the one or more sets of return fiber lines is connected to a second subset of said output couplers within the respective one of said sensor groups;
wherein coupling ratios of said input couplers and said output couplers in said sensor groups are chosen to reduce differences in returned optical signal power levels;
wherein said output couplers comprise a first output coupler and a second output coupler, wherein a first number of said output coupler are located between said first output coupler and a signal destination on one of said return fiber lines, wherein the first number is greater than or equal to zero, wherein the coupling ratio of said first output coupler is based on the first number, wherein a second number of said output couplers are located between said second output coupler and the signal destination on the one of said return fiber lines, wherein the coupling ratio of said second output coupler is based on the second number, wherein the second number is greater than the first number, wherein the coupling ratio of said second output coupler is larger than the coupling ratio of said first output coupler.

20. The sensor array of claim 19, wherein the one or more sets of return fiber lines comprise one or more pairs of return fiber lines, wherein a first return fiber line of each of the one or more pairs of return fiber lines is connected to the first subset of said output couplers within the respective one of said sensor groups, wherein a second return fiber line of each of the one or more pairs of return fiber lines is connected to the second subset of said output couplers within the respective one of said sensor groups.

21. The sensor way of claim 19, wherein one or more return fiber lines of said return fiber lines are each coupled with two or more corresponding non-adjacent instances of the sensors.

22. The sensor array of claim 19, wherein said sensor group comprise 16 sensor groups, wherein said sensor comprise 6 sensors.

23. The sensor array of claim 19, wherein said sensor group comprise 8 sensor groups, wherein said sensor comprise 12 sensors.

* * * * *